United States Patent
Benny et al.

(10) Patent No.: US 9,602,308 B2
(45) Date of Patent: Mar. 21, 2017

(54) SERVICING PACKETS IN A VIRTUAL NETWORK AND A SOFTWARE-DEFINED NETWORK (SDN)

(71) Applicant: International Business Machines Corporation, Armonk, NY (US)

(72) Inventors: Stephan Benny, San Jose, CA (US); Amitabha Biswas, San Francisco, CA (US); Rachappa B. Goni, Bangalore (IN); Uday S. Nagaraj, Sunnyvale, CA (US); Prashanth K. Nageshappa, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 14/312,522

(22) Filed: Jun. 23, 2014

(65) Prior Publication Data
US 2015/0372840 A1 Dec. 24, 2015

(51) Int. Cl.
*H04L 12/28* (2006.01)
*H04L 12/46* (2006.01)

(52) U.S. Cl.
CPC ...... *H04L 12/4675* (2013.01); *H04L 12/4641* (2013.01)

(58) Field of Classification Search
CPC .............................. H04L 12/28; H04L 12/56
See application file for complete search history.

(56) References Cited

U.S. PATENT DOCUMENTS

| | | |
|---|---|---|
| 8,085,662 B2 | 12/2011 | Hiscock |
| 8,281,302 B2 | 10/2012 | Durazzo et al. |
| 8,370,528 B2 | 2/2013 | Bryers et al. |

(Continued)

FOREIGN PATENT DOCUMENTS

JP   WO 2004082185 A3 * 11/2004 .......... H04W 76/022

OTHER PUBLICATIONS

"Enabling Service Chaining on Cisco Nexus 1000V Series," 2013 Cisco, Jun. 2013, pp. 1-25.

(Continued)

*Primary Examiner* — Chi H Pham
*Assistant Examiner* — Raul Rivas
(74) *Attorney, Agent, or Firm* — Zilka-Kotab, PC

(57) ABSTRACT

In one embodiment, an apparatus includes a processor and logic configured to designate one of a plurality of endpoint virtual network identifiers (EPVNIDs) for each endpoint device in a network, wherein each EPVNID is configured to be shared by one or more endpoint devices, designate a common waypoint virtual network identifier (WPVNID) for all transparent waypoint devices in the network which perform a same function, designate a unique WPVNID for each routed waypoint device in the network, designate a common virtual network identifier (VNID) for all virtual switches in a single virtual network, wherein a different VNID is designated for each virtual network, and create a service chain table comprising each VNID, WPVNID, and EPVNID designated in the network individually correlated with at least a pair of VNIDs: a source VNID and a destination VNID, based on one or more policies affecting application of services to packets in the network.

14 Claims, 11 Drawing Sheets

(56) References Cited

U.S. PATENT DOCUMENTS

| | | | |
|---|---|---|---|
| 2002/0018448 A1* | 2/2002 | Amis | H04L 29/12254 |
| | | | 370/255 |
| 2006/0039371 A1* | 2/2006 | Castro | H04L 12/42 |
| | | | 370/389 |
| 2012/0246282 A1* | 9/2012 | Oguchi | H04L 12/66 |
| | | | 709/221 |
| 2013/0074066 A1 | 3/2013 | Sanzgiri et al. | |
| 2013/0107709 A1 | 5/2013 | Campbell et al. | |
| 2013/0155902 A1 | 6/2013 | Feng et al. | |
| 2013/0223449 A1 | 8/2013 | Koganti et al. | |
| 2013/0305085 A1 | 11/2013 | Ocko et al. | |
| 2014/0101656 A1 | 4/2014 | Zhu et al. | |
| 2016/0366046 A1 | 12/2016 | Anantharam et al. | |

OTHER PUBLICATIONS

Anonymous, "Method and System for Reducing Latency of Flows in a Software Defined Network (SDN) Service Appliance Chain," IP.com Prior Art Database Technical Disclosure, Jan. 6, 2015 (Grace Period Article by Another).

Salvestrini et al., "Towards a distributed SDN control: Inter-platform signaling among flow processing platforms," Future Networks and Services, 2013, pp. 1-7.

Anantharam et al., U.S. Appl. No. 14/735,109, filed Jun. 9, 2015.

List of IBM Patents or Patent Applications Treated as Related.

* cited by examiner

SERVICING PACKETS IN A VIRTUAL NETWORK AND A SOFTWARE-DEFINED NETWORK (SDN)

BACKGROUND

The present invention relates to service appliances in virtual networks, and more particularly, this invention relates to service chaining in virtual networks and software-defined networks (SDNs).

Network virtualization is implemented by many vendors using overlay technologies, such as Virtual Extensible Local Area Network (VXLAN), Network Virtualization using Generic Routing Encapsulation (NVGRE), etc., to form tunnels, where an identifier is used to indicate a virtual network for each tunneled packet. These technologies enable multiple virtual networks to be utilized over the same physical network. Usually, a virtual switch component in a host or a virtualization layer (e.g., a hypervisor) provides the virtual ports which may be used to associate virtual machines (VMs) to the various virtual networks.

Even though communication within a virtual network is a given, it is possible to allow or control communication across virtual networks. In physical networks, it is possible to use service appliances, such as those which implement firewalls, transcoding, load balancing, etc. Normally, the service appliances are inserted as a "bump in the wire" between the networks and/or services. These kind of service appliances (e.g., "waypoints") are not currently supported in virtual networks. However, since network virtualization abstracts physical Layer-2/Layer-3 networks, the use of physical appliances in a virtual network becomes a serious challenge. A bump in the wire insertion of one or more service appliances is not possible in virtual networks, as multiple virtual networks may share the same physical infrastructure and service appliances may not be able to distinguish between packets belonging to one specific virtual network from all the others.

There are some mechanisms available to allow for the insertion of service appliances in overlay networks defined by a SDN. Once the service appliances are inserted into the overlay network, the management and control plane configure the data forwarding layers so that data frames in the overlay network follow the path defined by the overlay network administrator, e.g., the SDN controller. However, there is currently no solution which allows for a service appliance to be inserted into an overlay network without requiring the service appliance to engage in some control plane activity with other components. This control plane activity is a potential drawback, and should be avoided when possible.

SUMMARY

In one embodiment, an apparatus includes a processor and logic integrated with and/or executable by the processor, the logic being configured to designate one of a plurality of endpoint virtual network identifiers (EPVNIDs) for each endpoint device in a network, wherein each EPVNID is configured to be shared by one or more endpoint devices, designate a common waypoint virtual network identifier (WPVNID) for all transparent waypoint devices in the network which perform a same function, designate a unique WPVNID for each routed waypoint device in the network, designate a common virtual network identifier (VNID) for all virtual switches in a single virtual network, wherein a different VNID is designated for each virtual network, and create a service chain table comprising each VNID, WPVNID, and EPVNID designated in the network individually correlated with at least a pair of VNIDs: a source VNID and a destination VNID, based on one or more policies affecting application of services to packets in the network.

In another embodiment, a method includes designating one of a plurality of EPVNIDs for each endpoint device in a network, wherein each EPVNID is configured to be shared by one or more endpoint devices, designating a common WPVNID for all transparent waypoint devices in the network which perform a same function, designating a unique WPVNID for each routed waypoint device in the network, designating a common VNID for all virtual switches in a single virtual network, wherein a different VNID is designated for each virtual network, and creating a service chain table comprising each VNID, WPVNID, and EPVNID designated in the network individually correlated with at least a pair of VNIDs: a source VNID and a destination VNID, based on one or more policies affecting application of services to packets in the network.

In yet another embodiment, an apparatus includes a processor and logic integrated with and/or executable by the processor, the logic being configured to receive one or more packets to be switched to a next hop, the one or more packets indicating a destination address and a first VNID, send a query to a controller in order to determine a service chain for the one or more packets, the query including the first VNID and the destination address, and receive a response that includes the next hop and a next routed hop for the one or more packets.

Other aspects and embodiments of the present invention will become apparent from the following detailed description, which, when taken in conjunction with the drawings, illustrate by way of example the principles of the invention.

DETAILED DESCRIPTION

Figure 1:
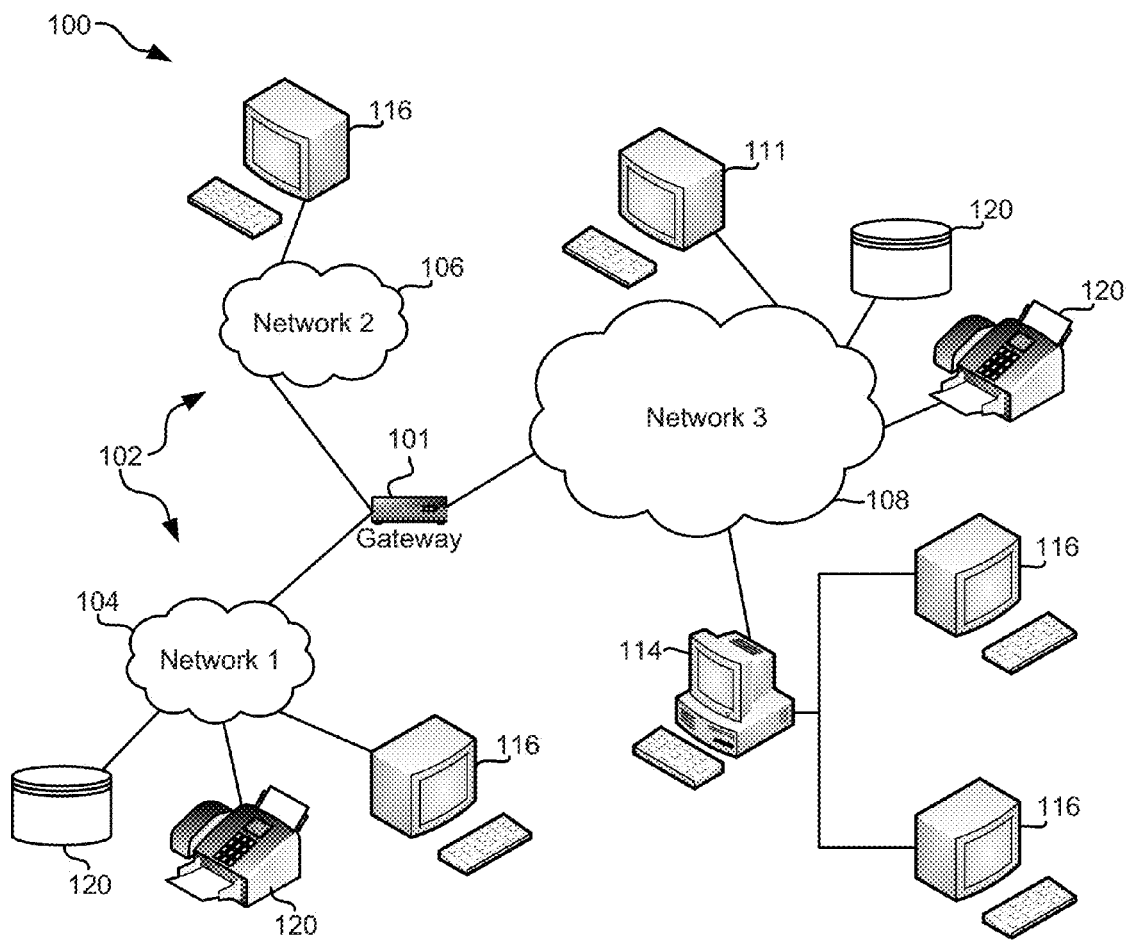
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In one approach, once a service appliance configuration is pushed to the control plane, a virtual switch queries the control plane regarding where to direct a particular overlay data frame (overlay-encapsulated packet) to, when the virtual switch does not already have the destination from a previous query. The control plane, which has full knowledge of the topology and the configuration of the overlay network, returns the next hop for the frame (which could be a service appliance). At each point/hop of the data frame's path to the final destination, this decision is taken with the help of the control plane. Some of the control plane messages and computations which are used to perform these tasks are disclosed herein according to various embodiments. Since there could be a variety of overlay flows in a deployment, the control plane entity is configured to optimize search algorithms to return the next hop of a data frame quickly. A variety of tables may be used to achieve the desired speed for a query from a virtual switch.

Also, network virtualization technology currently does not support insertion of virtual service appliances into virtual networks by catering to specific packet forwarding requirements of the virtual service appliance. In one embodiment, virtual service appliances (e.g., "waypoints") are supported by providing special ports on each of the virtual switches for connecting to the virtual service appliance(s). These special ports will cater to the packet forwarding needs of the waypoints.

In one general embodiment, an apparatus includes a processor and logic integrated with and/or executable by the processor, the logic being configured to designate one of a plurality of endpoint virtual network identifiers (EPVNIDs) for each endpoint device in a network, wherein each EPVNID is configured to be shared by one or more endpoint devices, designate a common waypoint virtual network identifier (WPVNID) for all transparent waypoint devices in the network which perform a same function, designate a unique WPVNID for each routed waypoint device in the network, designate a common virtual network identifier (VNID) for all virtual switches in a single virtual network, wherein a different VNID is designated for each virtual network, and create a service chain table comprising each VNID, WPVNID, and EPVNID designated in the network individually correlated with at least a pair of VNIDs: a source VNID and a destination VNID, based on one or more policies affecting application of services to packets in the network.

In another general embodiment, a method includes designating one of a plurality of EPVNIDs for each endpoint device in a network, wherein each EPVNID is configured to be shared by one or more endpoint devices, designating a common WPVNID for all transparent waypoint devices in the network which perform a same function, designating a unique WPVNID for each routed waypoint device in the network, designating a common VNID for all virtual switches in a single virtual network, wherein a different VNID is designated for each virtual network, and creating a service chain table comprising each VNID, WPVNID, and EPVNID designated in the network individually correlated with at least a pair of VNIDs: a source VNID and a destination VNID, based on one or more policies affecting application of services to packets in the network.

In yet another general embodiment, an apparatus includes a processor and logic integrated with and/or executable by the processor, the logic being configured to receive one or more packets to be switched to a next hop, the one or more packets indicating a destination address and a first VNID, send a query to a controller in order to determine a service chain for the one or more packets, the query including the first VNID and the destination address, and receive a response that includes the next hop and a next routed hop for the one or more packets.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
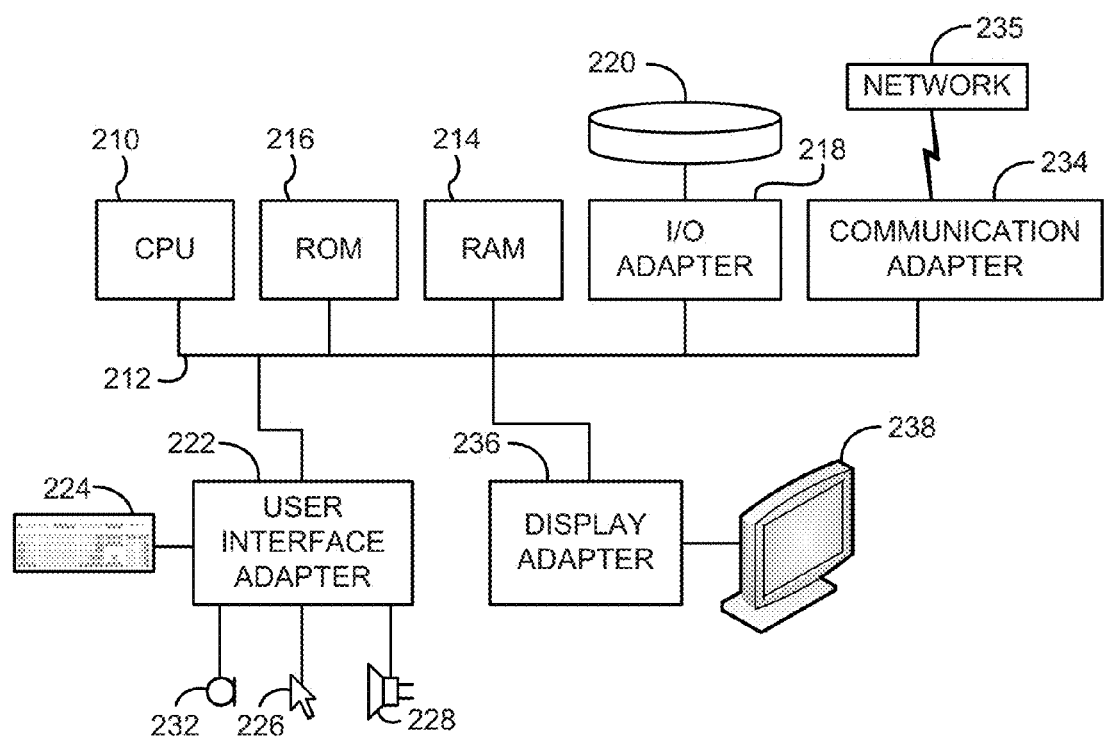
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates atypical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
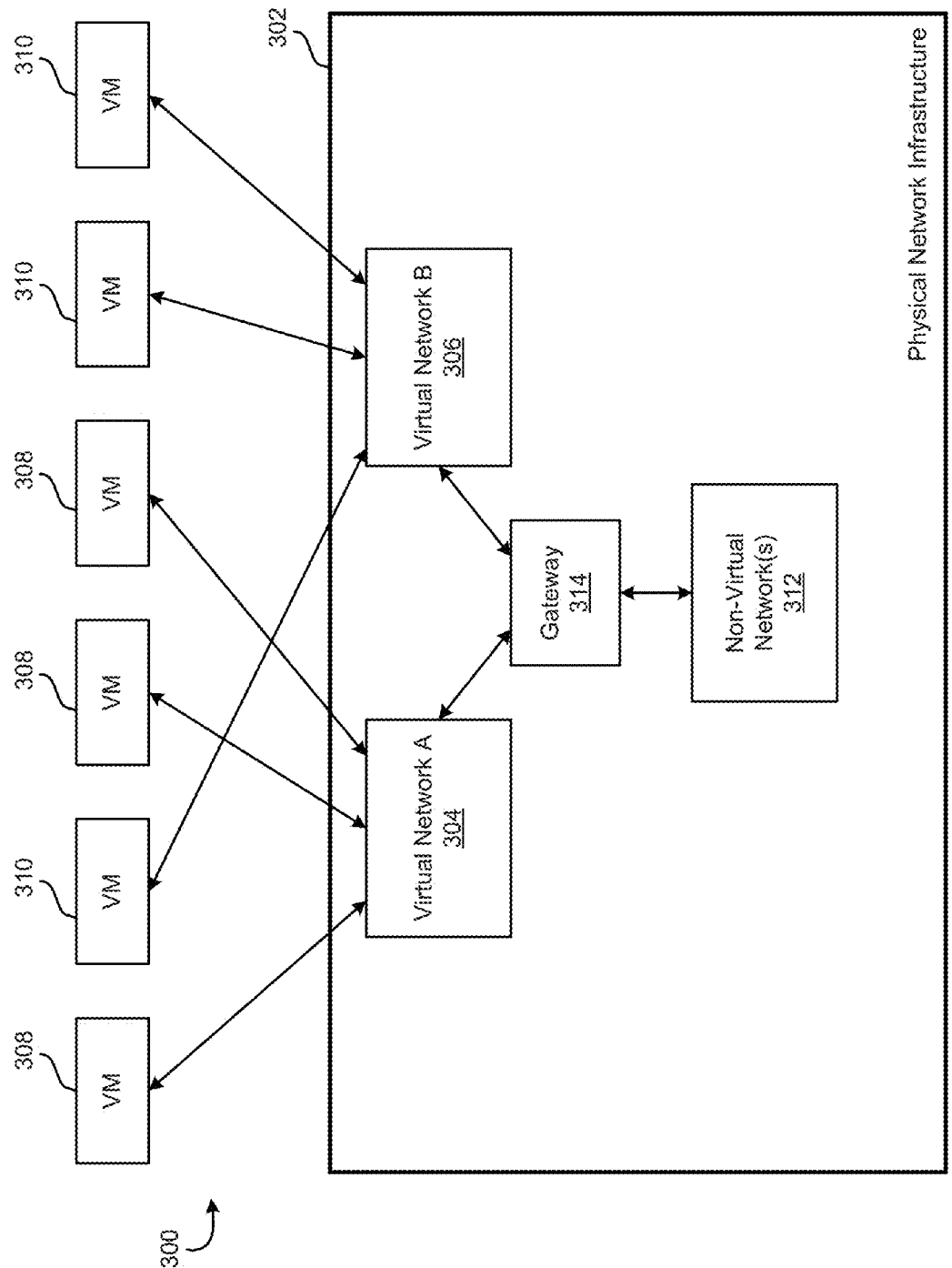
FIG. 3 is a simplified diagram of a virtualized data center, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/ or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of VMs 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

Components of an overlay network 300 typically identify where to route packets based on a virtual network identifier, referred to as a VNI or VNID. This is typically a 24-bit code or number, which excludes 0x0 and 0xFFFFFF. The overlay network 300 has the capability of tunneling Layer-2 (L2) packets over the Layer-3 (L3) network by encapsulating the packets into an overlay header. This may be performed using virtual extensible local area network (VXLAN) or some other overlay capable protocol, such as locator/ID separation protocol (LISP), overlay transport virtualization (OTV), Network Virtuatization using Generic Routing Encapsulation (NVGRE), etc.

The packet may also be encapsulated in a user datagram protocol (UDP) and internet protocol (IP) UDP/IP header. The overlay network 300 may include one or more point-to-point tunnels, and/or point-to-multipoint tunnels. In addition, any of these tunnels may be created, removed, altered and modified based on any number of factors, such as new devices being added to the overlay network 300, removal of devices from the overlay network 300, startup of any end devices, i.e., devices managing tunnel end points, such as virtual overlay network gateways, Hypervisors, switches capable of overlay functionality, etc.

In order for a device to manage a tunnel, there needs to be a mapping between an original packet's source address, destination address, and a tunnel identifier. In this way, a physical server is capable of forwarding the encapsulated original packet to the proper destination device.

A virtual network may be identified by a tunnel endpoint identifier, referred to as a Virtual Network ID (VNID). In one embodiment, there may be multiple different types or categories of VNIDs. In one such embodiment, an Endpoint VNID (EPVNID) may be used to denote source and/or destination devices, such as hosts, VMs, etc. There are no restrictions on the number of devices that may exist in any single and of course, there may be many unique EPVNIDs that exist in a physical network infrastructure. According to another embodiment, a Waypoint VNID (WPVNID) may be used to denote a single waypoint device ("bump in the wire," such as a VM, appliance, etc.) that is positioned between other devices in a path through the physical infrastructure. Each waypoint device is assigned a unique WPVNID so that it may be uniquely described in a path definition through the network.

According to one embodiment, waypoint policies may be used to define the way that traffic should flow between a source device and a destination device (source and destination endpoints). These policies may be created for each port on a distributed virtual switch, or just for some of the ports as determined by the administrator. Each waypoint policy may be applied based on any factor or combination of factors, such as on the basis of a source destination media access control (MAC) address, a destination MAC address, a protocol, a Layer-4 (L4) port, an inter-virtual network, etc. Each policy may identify a unique WPVNID and may be made available to all the virtual switches, such as via a software-defined network (SDN) controller or some other device that is in communication with all the virtual switches in the overlay network and/or SDN.

Table 1 shows an exemplary port identifier (Port ID)-based waypoint policy that may be implemented in a virtual network according to one embodiment.

TABLE 1

| Port ID | Waypoint Policy | Waypoint ID (WPVNID) |
|---|---|---|
| 10 | — | — |
| 20 | SMAC = 11:22:33:44:55:66 & TCP Port 488 | 100, 101 |
| 30 | DMAC = aa:bb:cc:dd:ee:ff | 200, 220 |

In this exemplary Port ID-based waypoint policy, no action is specified for Port ID 10, while on Port ID 20 for each packet or frame having a source MAC address (SMAC) of 11:22:33:44:55:66 and a transmission control protocol (TCP) Port identifier of 488, the packet or frame is routed through a waypoint device having a WPVNID of 100 and waypoint device having a WPVNID of 101, in that order. Also, for Port ID 30, each packet or frame having a destination MAC address (DMAC) of aa:bb:cc:dd:ee:ff, the packet or frame is routed through a waypoint device having a WPVNID of 200 and a waypoint device having a WPVNID of 220, in that order.

Table 2 shows an exemplary intra virtual network-based waypoint policy that may be implemented in a virtual network according to one embodiment.

TABLE 2

| VNID | Waypoint ID (WPVNID) |
|---|---|
| 15 | 300 |
| 25 | 400, 401 |
| 100 | 500, 550, 551 |

As shown in Table 2, in this exemplary intra virtual network-based waypoint policy, for each packet or frame specifying VNID 15, the packet or frame is routed through a waypoint device having a WPVNID of 300. Also, for each packet or frame specifying VNID 25, the packet or frame is routed through a waypoint device having a WPVNID of 400 and a waypoint device having a WPVNID of 401, in that order. Furthermore, for each packet or frame specifying VNID 100, the packet or frame is routed through a waypoint device having a WPVNID of 500, a waypoint device having a WPVNID of 550, and a waypoint device having a WPVNID of 551, in that order.

Table 3 shows an exemplary inter virtual network-based waypoint policy that may be implemented in a virtual network according to one embodiment.

TABLE 3

| S-VNID | D-VNID | Waypoint ID (WPVNID) |
|---|---|---|
| 10 | 15 | 600 |
| 20 | 25 | 700, 701, 704 |

As shown in Table 3, in this exemplary inter virtual network-based waypoint policy, for each packet or frame specifying a source VNID (S-VNID) of 10 and a destination VNID (D-VNID) of 15, the packet or frame is routed through a waypoint device having a WPVNID of 600. Also, for each packet or frame specifying a S-VNID of 20 and a D-VNID of 25, the packet or frame is routed through a waypoint device having a WPVNID of 700, a waypoint device having a WPVNID of 701, and a waypoint device having a WPVNID of 704, in that order.

Of course, these are just examples of waypoint policies, and actual waypoint policies may be based on any combination of factors, characteristics, and/or values stored within and without packets and/or frames received transmitted in a virtual network.

Figure 4:
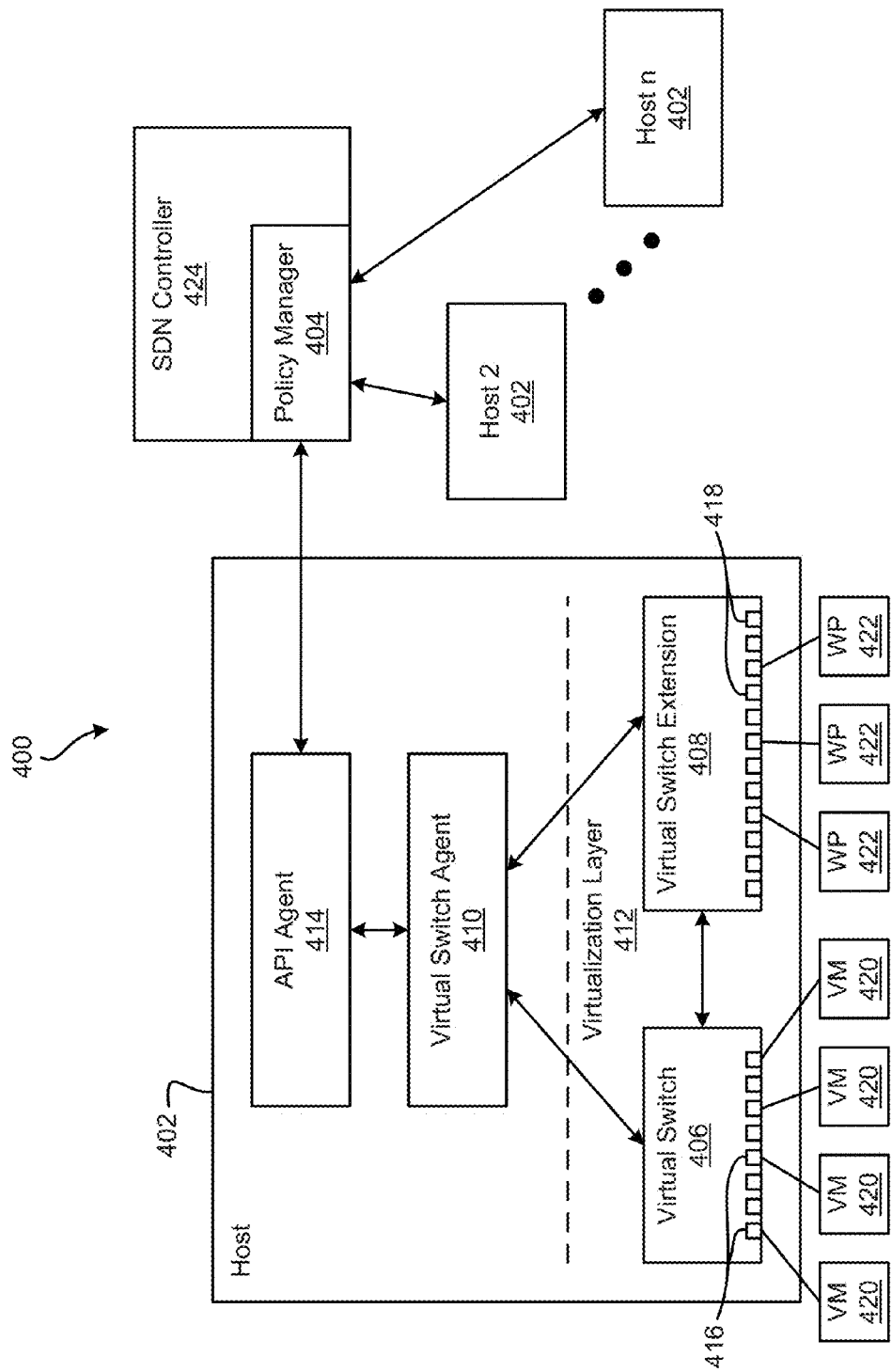
FIG. 4 is a simplified diagram of a system in accordance with one embodiment.

Now referring to FIG. 4, a system 400 is shown according to one embodiment. The system 400 includes a host 402 in communication with a waypoint or policy manager 404. The waypoint or policy manager 404 may be implemented in a SDN controller 424 or some other suitable controller configured to communicate with the host(s) 402, or may be a standalone device, module, processor, etc. More than one host 402 may be present in the system 400, according to various embodiments. The host 402 includes a virtual switch 406 (which may also include a virtual switch extension 408), along with a virtual switch agent 410 configured to communicate with the virtual switch 406 (and possibly the virtual switch extension 408), in order to handle packet ingress and egress through the virtual switch 406 (and possibly the virtual switch extension 408). The virtual switch 406 is configured to handle normal packet (packets which do not indicate handling by any WPVNIDs) ingress and egress along with packet ingress and egress from and to waypoint device(s) that are connected to the host 402. Should a virtual switch extension 408 be included in the virtual switch 406, it may be configured to handle packet ingress and egress from and to waypoint device(s) that are connected to the host 402, while the normal packet ingress and egress is handled by the virtual switch 406. Should no waypoint devices be connected to the host 402, then the virtual switch extension 408 will not be utilized.

The virtual switch 406 may include a plurality of VM ports 416, each VM port 416 being capable of communicating with one VM 420 connected to the virtual switch 406. Also, the virtual switch 406 and/or the virtual switch extension 408 includes one or more waypoint ports 418, each waypoint port 418 configured to communicate with one waypoint device 422 connected to the waypoint port 418.

In one embodiment, when the virtualization layer 412 is a Hypervisor, the virtual switch 406 may be implemented as a 'vSwitch,' the virtual switch agent 410 may be implemented as a 'vswitch agent,' and/or the virtual switch extension 408 may be implemented as a 'vSwitch extension,' terms which are specific to Hypervisor.

The host 402 also includes an application programming interface (API) agent 414 which is independent of the virtualization layer 412. The API agent 414 is configured to interact and communicate with the policy manager 404, among other tasks and function known in the art.

Each VM port 416 on the virtual switch 406 is associated with a VNID, with VM ports 416 having the same VNID when they are within and/or on the same virtual network. Each waypoint device 422 service is within and/or on a unique VNID referred to as a WPVNID, with no other VM 420 and/or waypoint device 422 providing a different service being within and/or on that WPVNID. Put another way, there may be multiple waypoint devices 422 in a single VNID when each provides the exact same functionality. This may be implemented in high-availability waypoint device functionality.

Figure 5A:
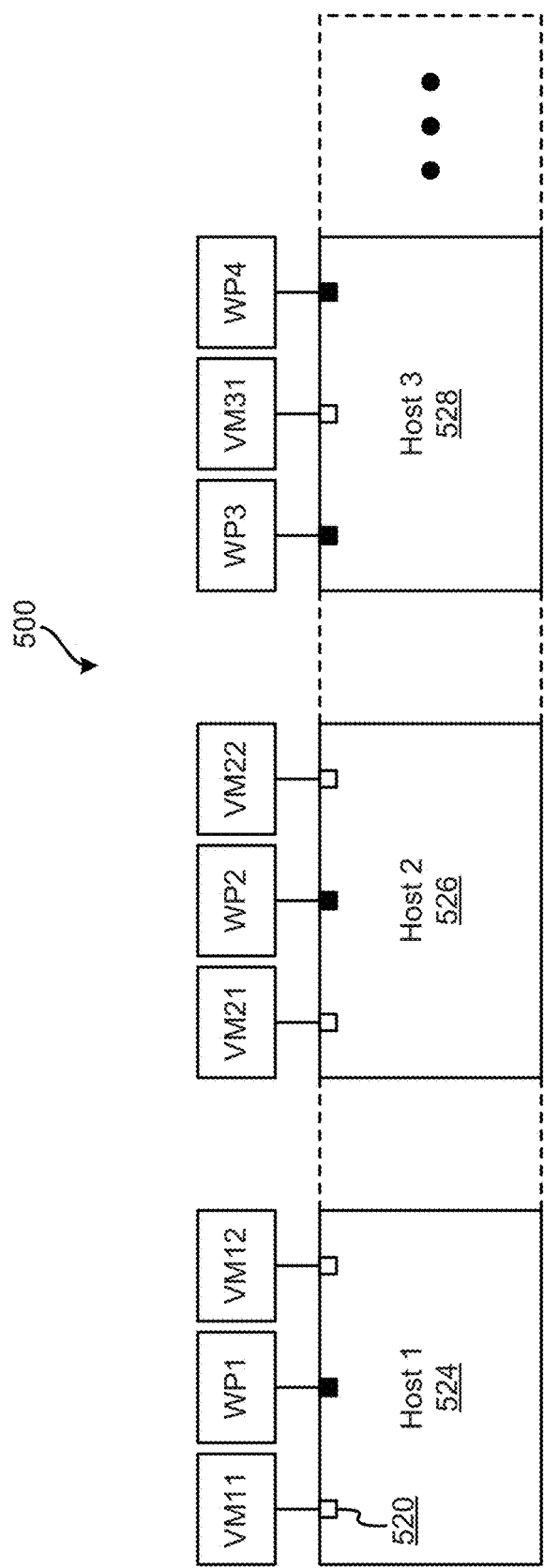
FIG. 5A is a block diagram of a distributed virtual switch system in accordance with one embodiment.

Now referring to FIG. 5A, a distributed virtual switch system 500 is shown to describe how policy information may be made available to each virtual switch on each of the hosts, e.g., first host 524, second host 526, third host 528, etc. In order to share this policy information, each virtual switch is configured to create a tunnel between endpoint devices such that the traffic will pass-though desired waypoint device(s) (when configured to do so according to the waypoint policy).

When a packet or frame ingresses from a VM port 520, a policy/rule lookup is applied. This policy/rule may dictate that the packet or frame is routed through none, one, or multiple waypoint devices or appliances before being transmitted to its final destination endpoint device.

Figure 5B:
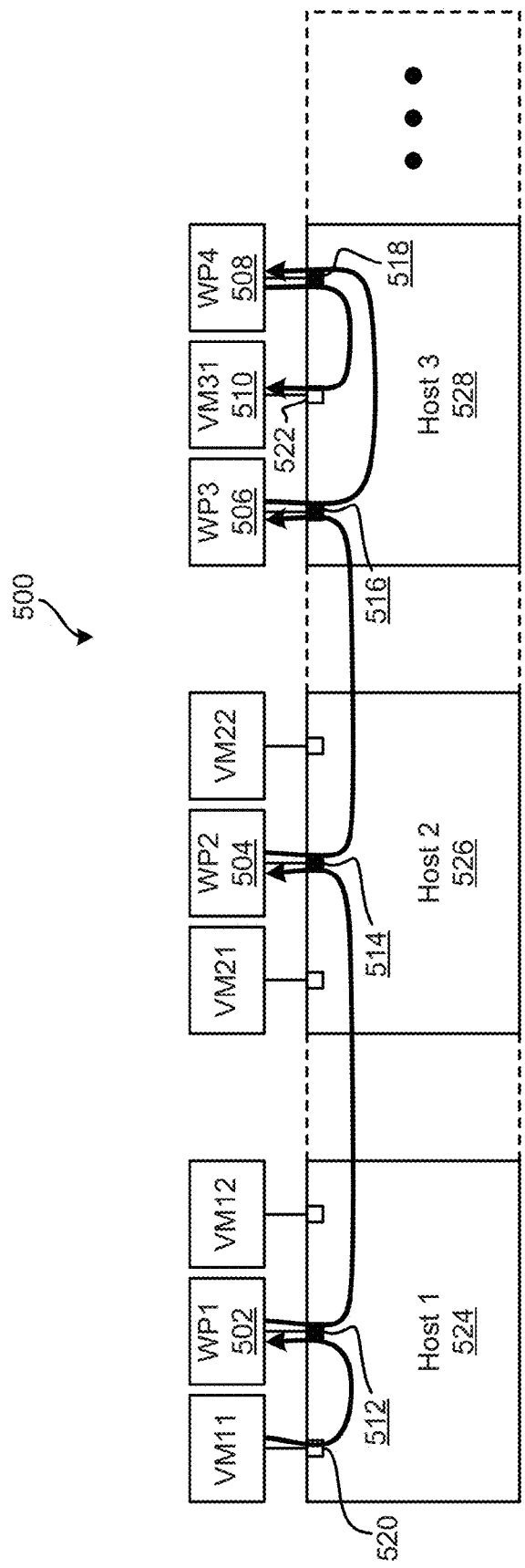
FIG. 5B is a block diagram of a distributed virtual switch system in which services are applied to packets in accordance with an exemplary embodiment.

In one example, as shown FIG. 5B, the policy/rule dictates that the packet or frame is routed through waypoint devices 502, 504, 506, and 508 before being transmitted to an endpoint device 510. Therefore, the packet or frame is tunneled to the first waypoint device 502 according to the policy/rule, with a VNID in a header of the packet or frame being set to the WPVNID of the target (first) waypoint device 502. The packet or frame is then mapped to an egress port 512 based on the WPVNID specified in the packet. The packet or frame is egressed via the port 512 where the first waypoint device 502 is connected.

The packet or frame then is ingressed from the port 512 connected to the first waypoint device 502, and the policy/rule lookup is applied again to determine the next destination of the packet or frame. In this example, the next destination is the second waypoint device 504 in the second host 526. Therefore, the packet or frame is tunneled to the second waypoint device 504 according to the policy/rule, with a VNID in the header of the packet or frame being set to the WPVNID of the target (second) waypoint device 504. The packet or frame is then mapped to an egress port 514 based on the WPVNID specified in the packet. The packet or frame is egressed via the port 514 where the second waypoint device 504 is connected.

The packet or frame then is ingressed from the port 514 connected to the second waypoint device 504, and the policy/rule lookup is applied again to determine the next destination of the packet or frame. In this example, the next destination is the third waypoint device 506 in the third host 528. Therefore, the packet or frame is tunneled to the third waypoint device 506 according to the policy/rule, with a VNID in the header of the packet or frame being set the WPVNID of the target (third) waypoint device 506. The packet or frame is then mapped to an egress port 516 based on the WPVNID specified in the packet. The packet or frame is egressed via the port 516 where the third waypoint device 506 is connected.

The packet or frame then is ingressed from the port 516 connected to the third waypoint device 506, and the policy/rule lookup is applied again to determine the next destination of the packet or frame. In this example, the next destination is the fourth waypoint device 508 that is also in the third host 528. Therefore, a VNID in the header of the packet or frame is set to the WPVNID of the target (fourth) waypoint device 508, the packet or frame is mapped to an egress port 518 based on the WPVNID specified in the packet, and the packet or frame is egressed via the port 518 where the fourth waypoint device 508 is connected. Then, after the packet or frame is ingressed from the port 518, a VNID in the header of the packet or frame is set to the EPVNID of the target endpoint device 510, the packet or frame is mapped to an egress port 522 based on the EPVNID specified in the packet or frame, and the packet or frame is egressed via the port 522 where the endpoint device 510 is connected.

Virtual service appliances in the network may be implemented in a number of diff ways. One such way is a transparent implementation via L2, which is referred to as a bump in the wire and/or bridged. This type of virtual service appliance implementation is transparent to other VMs, and does not change the MAC and/or IP address of the packet's destination. Some examples of transparent virtual service appliances include a L2 firewall service appliance, an intrusion detection system (IDS), an intrusion protection system (IPS), etc.

A virtual service appliance may also be implemented as a routed-network address translation (NAT) implementation, which is explicitly addressed by VMs using a front-end IP address, terminate incoming connections, and initiate outgoing connections with a new source address. Some examples of routed-NAT virtual service appliances include a L4-L7 application delivery controller (ADC), a web proxy, etc.

Another virtual service appliance may be implemented as a routed-explicit gateway implementation, which is explicitly configured as a subnet gateway by VMs, performs L3 routing (changes source MAC address), and interfaces in each subnet that is being serviced. Some examples of routed-explicit gateway virtual service appliances include a L3 firewall, NAT, a web proxy, etc.

According to another implementation, a virtual service appliance may be implemented as a routed-implicit gateway implementation, which may be a subnet gateway for VMs, where cross-subnet traffic is transparently directed to the virtual service appliance, such that no per-VM subnet gateway configuration is required. Some examples of routed-implicit gateway virtual service appliances include a L3 firewall, NAT, a web proxy, etc.

According to one embodiment, a user may configure the waypoints in the virtual network such that desired services may be rendered to packets or frames therein. These virtual service appliances may be attached to a specific VNID and/or network. A WPVNID identifies the type of service provided by that waypoint, while multiple (similar functionality) waypoints may co-exist on the same VNID. One configuration for two waypoints providing the same service in a virtual network is where both service appliances are active, and traffic may be distributed (load balanced) between them. In another embodiment, the two waypoints providing the same service in a virtual network may have an active/standby relationship.

Figure 6:
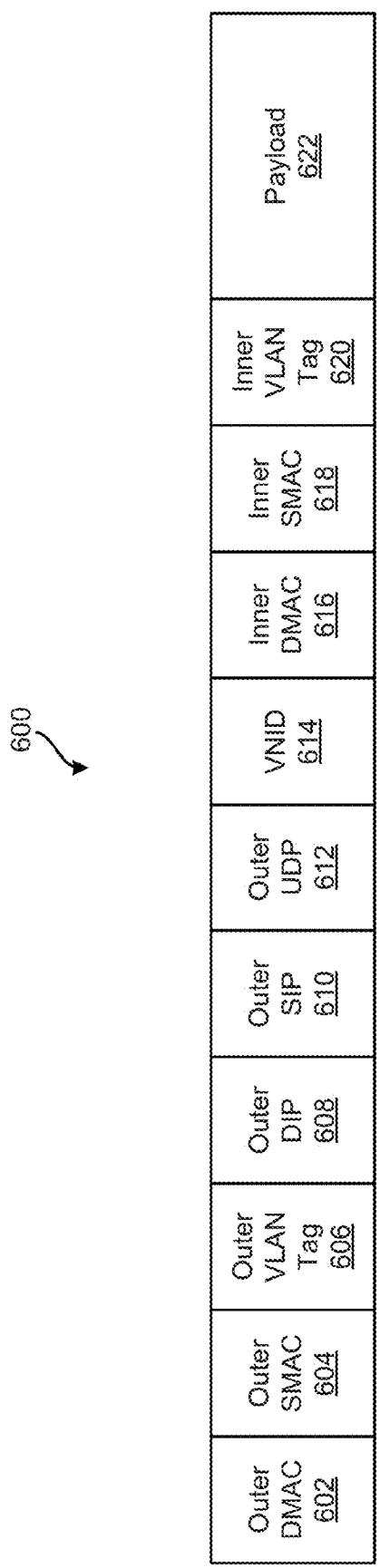
FIG. 6 is a diagram of a packet format according to one embodiment.

Now referring to FIG. 6, a packet format 600 is shown according to one embodiment. This packet format 600 may be used in a VXLAN implementation to encapsulate original packet(s) in order to tunnel the original packet(s) across the virtual network to have services applied thereto by the various virtual service appliances located in a virtual network. Of course, other packet headers than that shown in FIG. 6 may be used for this encapsulation which may adhere to other overlay technologies, such as NVGRE, LISP, OTV, etc., which may include additional fields, less fields, and/or different fields than those shown in the exemplary packet format 600, as would be understood by one of skill in the art.

The packet format 600 includes an outer destination MAC address (DMAC) field 602, an outer source MAC address (SMAC) field 604, an outer VLAN tau such as a IEEE 802.1Q) field 606, an outer destination IP address (DIP) field 608, an outer source IP address (SIP) field 610, an outer user datagram protocol (UDP) field 612, a VNID field 614 (which may include a protocol specific ID, such as a VXLAN ID), an inner DMAC field 616, an inner SMAC field 618, an optional inner VLAN tag field 620, and a payload 622 (which typically includes one or more original packets).

The VNID field 614 may be used to store a WPVNID indicating the waypoint device (such as a virtual service appliance) to which the packet is to be directed, an EPVNID indicating the endpoint device to which the packet is to be directed to, and/or a standard VNID indicating the virtual network of the packet. In one embodiment, the VNID field 614 may be 24 bits in length, 12 bits in length, 32 bits in length, or some other suitable length as determined by an administrator and recognized by all devices in the virtual network.

In one embodiment, the outer DIP field 608, the VNID field 614, and the inner DMAC field 616 may be populated by a virtual switch based on information retrieved from a SDN controller. The outer DIP field 608 is configured to store the next/final hop, which is typically a virtual switch (such as an OpenFlow switch, DOVE switch, etc.). The inner DMAC field 616 is configured to store an intermediate or destination VM, appliance, or virtual appliance MAC address for the original packet in the payload 622.

In another embodiment, a query may be sent to a SDN controller or some other suitable controller by the virtual switch (or DOVE switch, OpenFlow switch, etc.) to retrieve other information. For example, the inner SMAC field 618 is an optional field that is configured to store an input to the SDN controller for flow path determination and/or modification. Also, an inner SIP field and an inner field of the original packet in the payload 622 may also be configured to be inputs to the SDN controller for flow path determination and/or modification. The VNID associated with the originating VM or appliance may be determined by the query to the SDN controller or some other suitable controller by the virtual switch according to a further embodiment.

Therefore, according to one embodiment, there may be several interactions between the SDN controller and the one or more virtual and/or SDN-enabled switches in the virtual network. In another example, the one or more virtual and/or SDN-enabled switches may query the SDN controller for a location lookup, the query including a VNID along with a DIP and/or DMAC. The SDN controller may respond to this query with a next hop VNID, a next hop virtual or SDN-enabled switch, and/or a next hop DMAC (from an inner packet header). Furthermore, the one or more virtual and/or SDN-enabled switches may query the SDN controller for a policy lookup, the query including a VNID along with a DIP and/or DMAC and a SIP and/or SMAC. The SDN controller may respond to this query with a next hop VNID, a next hop virtual or SDN-enabled switch, and/or a next hop DMAC (from an inner packet header).

In order for these queries to be effective, the SDN controller may include and/or create the following mappings: VM to switch (given a VM, the virtual and/or SDN-enabled switch location is known), VM to host VNID, <MAC, VNID> to VM, <IP, VNID> to VM, VNID to [list of VMs in the VNID]. With these mappings, any query for information may be responded to with appropriate information allowing the packet to be transmitted to appropriate intermediate hops and the ultimate destination device.

In each virtual and/or SDN-enabled switch, these mappings may be included in a forwarding table, according to one embodiment. This forwarding table may be utilized to determine a destination address for a received packet which is to be forwarded on, and may be modified by the SDN controller to ensure that it is up-to-date.

Furthermore, in another example, the SDN controller may cause the virtual and/or SDN-enabled switches to flush the forwarding table stored therein, with a query for this purpose including a source VNID along with a list of MAC addresses or a list of destination VNIDs. A response to this query is an acknowledgement of completion of the flush. Flushing includes deleting and/or removing all or some of the entries in the forwarding table.

Figure 7:
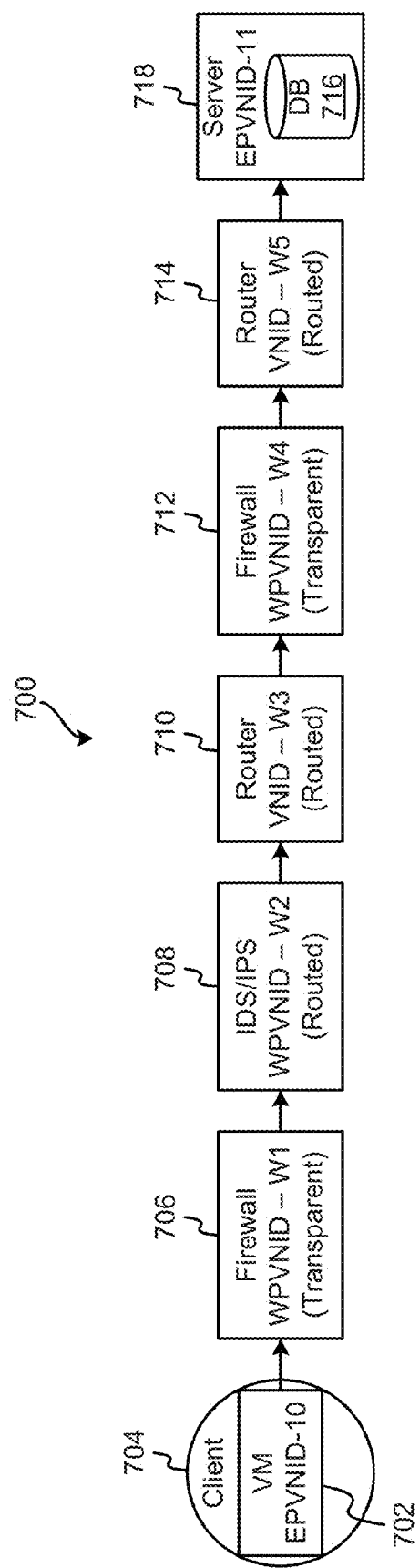
FIG. 7 is a block diagram of a service chain in accordance with one embodiment.

With reference to FIG. 7, a service chain 700 is shown according to one embodiment. In this service chain 700, a VM 702 (within EPVNID 10) on a client host 704 sends a query to reach a database (DB) 716 on a server 718 within EPVNID 11. The service chain, as devised the policy/rule implementation, includes a firewall 706 within WPVNID W1 (which acts as a transparent virtual service appliance), an IDS/IPS device 708 within WPVNID W2 (which acts as a routed virtual service appliance), a router 710 within VNID W3, a firewall 712 within WPVNID W4 (which acts as a transparent virtual service appliance), and a router 714 within VNID W5. Of course, any other virtual service appliances may be used in a service chain, in addition to, in place of, and/or instead of one or more of the virtual service appliances shown in the exemplary service chain 700 of FIG. 7.

Table 4 below shows the results of the various queries which are made along the service chain 700, in one example.

TABLE 4

| Querying VNID | (Source, Destination) VNID Pairs | Next Hop | Routed Hop |
|---|---|---|---|
| 10 | (10, 11), (10, W2) | W1 | W2 |
| W1 | (10, 11), (10, W2) | W2 | W2 |
| W2 | (10, 11), (10, W3) | W3 | W3 |
| W3 | (10, 11), (10, W5) | W4 | W5 |
| W4 | (10, 11), (10, W5) | W5 | W5 |
| W5 | (10, 11) | 11 | 11 |

The VNID may be derived from a <SIP, DIP> tuple in one embodiment.

Also, the querying VNID is the virtual and/or SDN-enabled switch making the policy lookup query, the (Source, Destination) VNID Pairs may be derived from the policy query, i.e., SIP, DIP, SMAC, DMAC, etc. The next hop indicates the next service in the chain, and the routed hop indicates the DMAC to be put in the inner packet header. When the routed hop is a WVNID (indicating that the routed hop is a waypoint device), then one of the VM ports (it does not matter which one) registered on that WVNID is returned as the inner DMAC address. When the routed hop is an EPVNID (indicating that the routed hop is an endpoint device), then the actual destination VM port is returned as the inner DMAC address.

Figure 8:
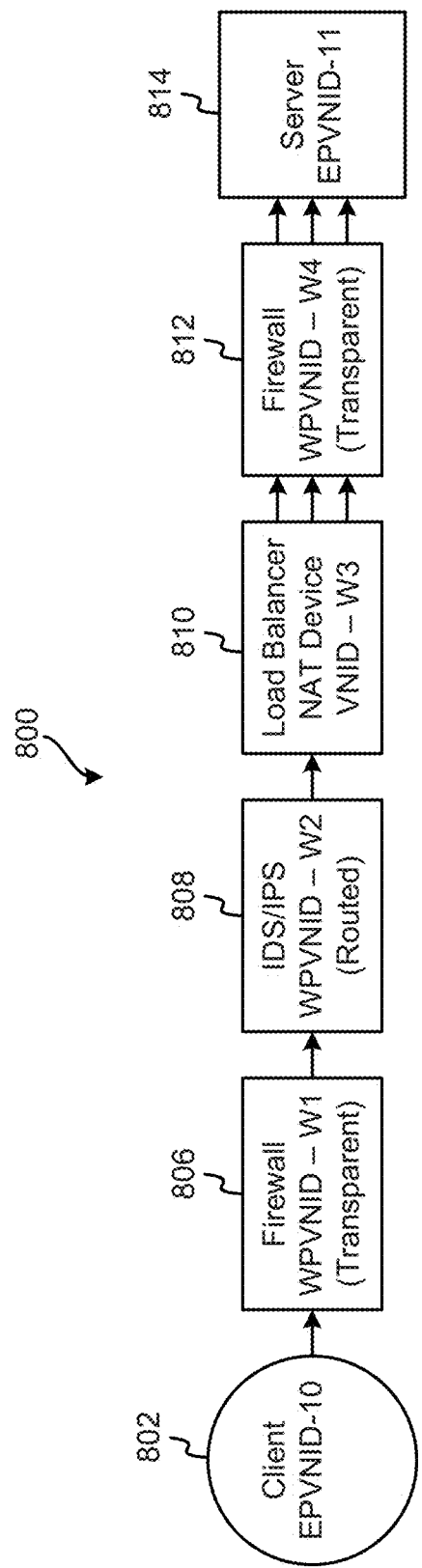
FIG. 8 is a block diagram of a service chain in accordance with another embodiment.

FIG. 8 shows a service chain 800 with a load balancer 810 according to one embodiment. In this exemplary service chain 800, a client 802 and a server 814 are endpoint devices having EPVNIDs 10 and 11, respectively. The service chain 800 includes a firewall 806 (transparent) within WPVNID W1 and a firewall 812 (transparent) within WPVNID W4, an IPS/IDS device 808 (routed) within WPVNID W2, and the load balancer 810 within WPVNID W3. Of course, any other virtual service appliances may be used in a service chain, in addition to, in place of and/or instead of one or more of the virtual service appliances shown in the exemplary service chain 800 of FIG. 8.

The load balancer 810 is configured to terminate connections coming in from the client 802 and create new connections to the server 814 (such as for access to the DB).

The service chain 800 is defined by an administrator, such as a user, the SDN controller, or some other entity capable of making such a determination. In this example, the service chain 800 is {W1→W2→W3→W4}. The policy/rule which implements this service chain may also be defined by an administrator, such as a user, the SDN controller, or some other entity capable of making such a determination. In this example, the policy is {10=11}={W1→W2→W3→W4}.

When the client 802 sends packets to an address in VNID W3, the SIP is set as VNID 10, and the DIP is set as VNID W3. However, when the VM (load balancer 810) in VNID W3 sends a packet to the server 814 in VNID 11, there are two ways of handling the egress: keep the SIP of VNID 10 and DIP of VNID 11, or set a new SIP of VNID W3 and DIP of VNID 11.

In order to resolve this ambiguity, one or more service chain tables may be maintained in the SDN controller or some other entity suitable for providing service chain information to the various components in the virtual network. Table 5 shows one such table according to one exemplary embodiment,

TABLE 5

| Querying VNID | (Source, Destination) VNID Pairs | Next Hop | Routed Hop |
|---|---|---|---|
| 10 | (10, W3) | W1 | W2 |
| W1 | (10, W3) | W2 | W2 |
| W2 | (10, W3) | W3 | W3 |
| W3 | (10, 11), (W3, 11) | W4 | W4 |
| W4 | (10, 11), (W3, 11) | 11 | 11 |

In one embodiment, the transition from EPVNID 10 to WPVNID W3 may be treated as one (S*, D*) combination for implementation in the service chain [W1, W2]. Furthermore, in another embodiment, the transition from EPVNID 10 to EPVNID 11 may be treated as several (S*, D*) combinations for implementation in the service chain [W4].

This results in the service chain table to be adjusted as it appears in Table 6, below.

TABLE 6

| Querying VNID | (Source, Destination) VNID Pairs | Next Hop | Routed Hop |
|---|---|---|---|
| 10 | (10, W3), (10, W2) | W1 | W2 |
| W1 | (10, W3), (10, W2) | W2 | W2 |
| W2 | (10, W3) | W3 | W3 |
| W3 | (10, 11), (10, W4) + (W3, 11), (W3, W4) | W4 | W4 |
| W4 | (10, 11), (W3, 11) | 11 | 11 |

The service chain tables may be used in the following context. An input and/or query is received from a SDN-enabled switch and/or a virtual switch that includes a query VNID for the service appliance/VM and a destination address (a and/or DMAC), along with an optional SIP and/or SMAC (for flow path determination purposes).

The SDN controller or some other suitable entity derives the source VNID from the SIP (and/or SMAC), which may be accomplished via a lookup on a hash table which correlates such addresses to one another, such as via a single operation O(1). Then, the destination VNID is derived from the DIP (and/or DMAC), which may also be accomplished via a lookup on the hash table which correlates such addresses to one another, such as via a single operation O(1). Then the service chain table is consulted, such as via a query with the query VNID and the source and destination VNID in a tuple, e.g., Query VNID+(Source VNID, Destination VNID). This provides a result, which includes a next hop and a next routed hop, e.g., Answer=Next Hop+Next Routed Hop. The next hop determines the next virtual and/or SDN-enabled switch+VNID, while the next routed hop determines the inner MAC address. This lookup costs a total of O(1).

Figure 9:
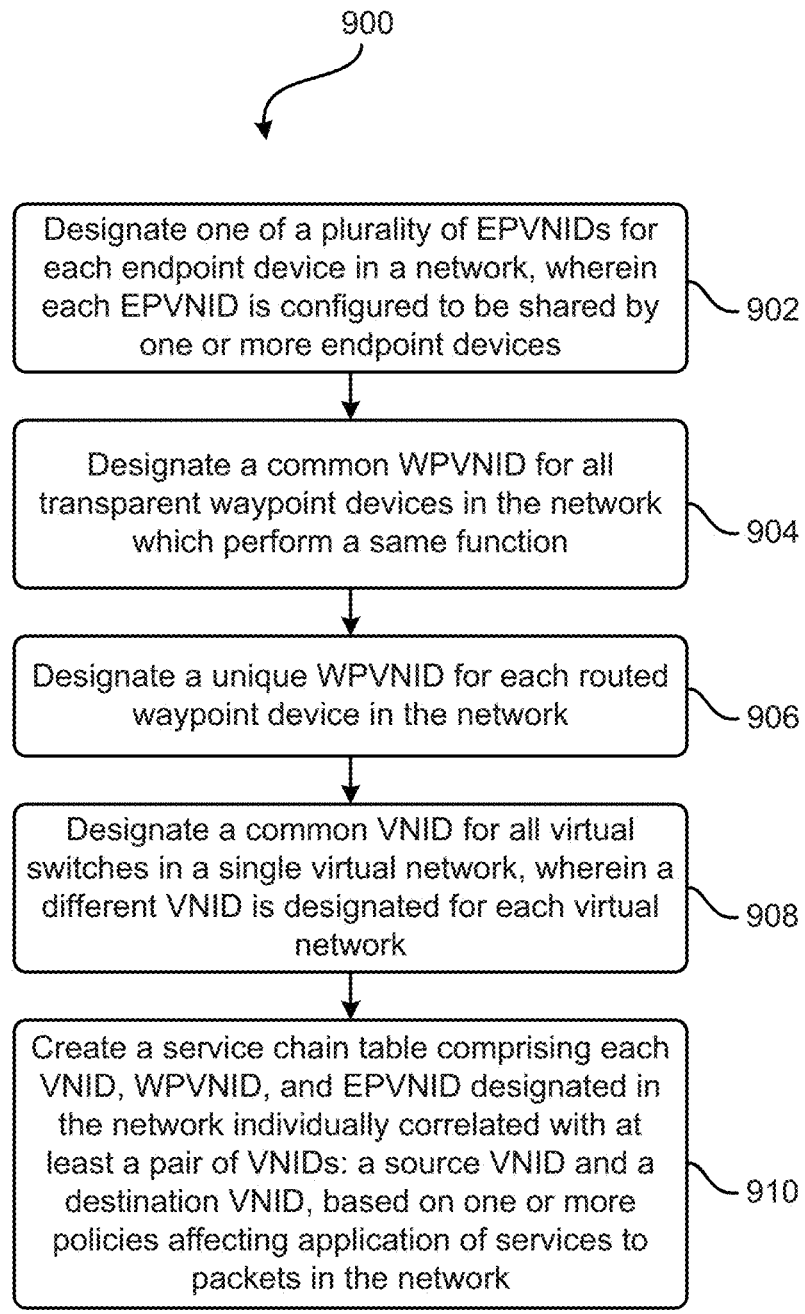
FIG. 9 is a flowchart of a method, according to one embodiment.

Now referring to FIG. 9, a flowchart of a method 900 is shown according to one embodiment. The method 900 may be performed in accordance with the present invention in any of the environments depicted in FIGS. 1-8, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by a mainframe, a server, a storage controller, an operating system of a storage system, or some other device having one or more processors and logic integrated with and/or executable by the processors. The processor, e.g., processing circuit(s), chip(s), and/or module(s) implemented in hardware and/or software, and preferably having at least one hardware component may be utilized in any device to perform one or more steps of the method 900. Illustrative processors include, hut are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, where one of a plurality EPVNIDs for each endpoint device in a network is designated. Each EPVNID is configured to be shared by one or more endpoint devices, as determined by a network administrator.

In operation 904, a common WPVNID is designated for all transparent) waypoint devices in the network which perform the same function. This operation has a caveat, multiple transparent waypoint devices which perform the same function are not implemented on a single host, such that only one transparent waypoint device performing a single function is implemented on any single host.

In operation 906, a unique WPVNID is designated for each routed waypoint device in the network. In this way, each routed waypoint device may be uniquely addressed and receive traffic accordingly.

In operation 908, a common VNID is designated for all virtual switches in a single virtual network. In this way, each virtual network will have a unique VNID from all other virtual networks so that a different VNID is designated for each virtual network.

In operation 910, a service chain table is created that includes each VNID, WPVNID, and EPVNID designated in the network individually correlated with at least a pair of VNIDs: a source VNID and a destination VNID, based on one or more policies affecting application of services to packets in the network. These policies may be designated by the administrator, user, or automatically by some other suitable entity known in the art.

In another embodiment, the service chain table may also include a next hop and a next routed hop individually correlated to each VNID, WPVNID, and EPVNID designated in the network.

The service chain table may be similar to one of those shown in Tables 4-5, in various embodiments. Furthermore, the policies may be represented by one of those shown in Tables 1-3, in various embodiments.

In one embodiment, the method 900 may further include receiving a query to determine a service chain for one or more packets, the query including a query VNID and a destination address. Furthermore, the query VNID represents the VNID for the one or more packets. After receiving this query, a next hop and a next routed hop may be determined for the one or more packets, according to one embodiment.

In a further embodiment, method 900 may also include deriving a first destination VNID using the destination address and deriving a first source VNID using a source address included in the query. This may be performed according to any of the methods described herein, along with others known in the art. In one embodiment, the next hop and the next routed hop may be determined by consulting the service chain table using the query VNID, the first destination VNID, and a first source VNID in order to retrieve the next hop and the next routed hop.

According to another embodiment, method 900 may include sending the next hop and the next routed hop in response to the query, such as to a virtual and/or SDN-enabled switch in the network (or some other device which sent the query).

Figure 10:
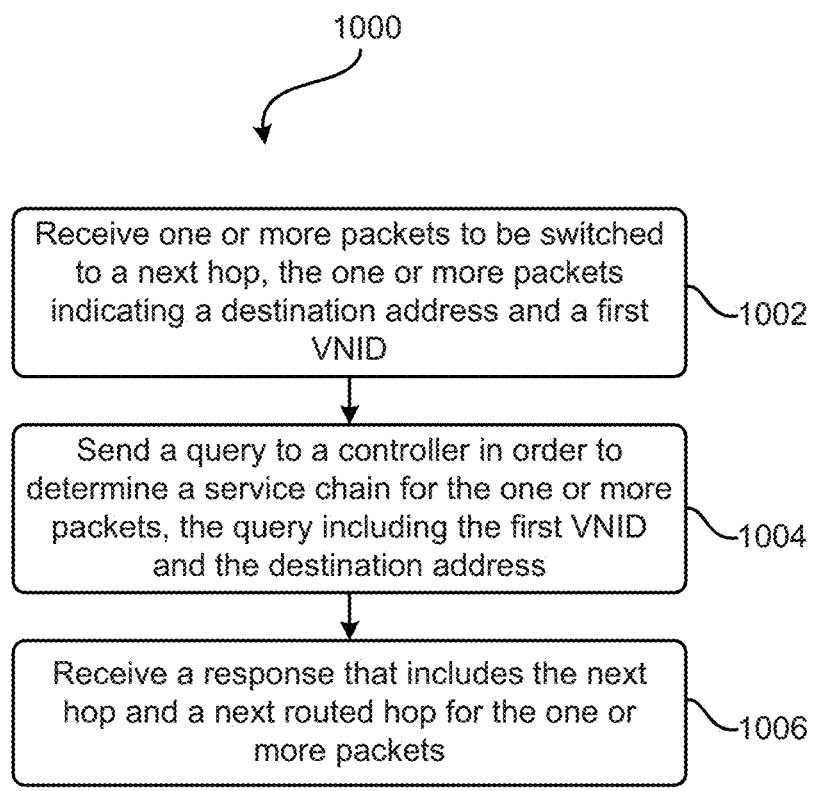
FIG. 10 is a flowchart of a method, according to one embodiment.

Now referring to FIG. 10, a flowchart of a method 1000 is shown according to one embodiment. The method 1000 may be performed in accordance with the present invention in any of the environments depicted in FIGS. 1-8, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a mainframe, a server, a storage controller, an operating system of a storage system, or some other device having one or more processors and logic integrated with and/or executable by the processors. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a CPU, an ASIC, a FPGA, etc., combinations thereof, or any other suitable computing device known in the art.

As shown in FIG. 10, method 1000 may initiate with operation 1002, here one or more packets are received to be switched to a next hop, the one or more packets indicating a destination address and a first VNID. The first VNID is associated with the one or more packets and indicate a virtual network to which the one or more packets belong.

In operation 1004, a query is sent to a controller in order to determine a service chain for the one or more packets, the query including the first VNID and the destination address. The controller may be a policy manager, a waypoint manager, a SDN controller (such as an OpenFlow controller, DOVE controller, etc.), or some other controller of a type known in the art that is suitable for handling such requests.

In operation 1006, a response to the query is received that includes the next hop and a next routed hop for the one or more packets. This response may be received from the same entity to which the query was sent or some other entity or intermediate entity in the network.

Method 1000 may further include encapsulating the one or more packets in a tunnel header, the tunnel header indicating a destination address as the next hop. Also, a destination address of the one or more packets may be designated as the next routed hop. Also, the method 1000 may include sending the one or more packets encapsulated in the tunnel header to the next hop using a tunnel created therebetween in order to ensure that the one or more packets flow through each waypoint device designated in a flow from the controller.

In one embodiment, the controller may be a SDN controller and the method may be implemented on a device configured to communicate with the SDN controller via a common protocol, such as a virtual switch in a host, a SDN-enabled switch, a DOVE switch, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., tight pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirety on the user's computer, partly on the user's computer, as a stand-alone software package, partly on the user's computer and partly on a remote computer or entirely on the remote computer, or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or Hock diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

Some of the advantages of the systems and methods described herein include not needing to alter or further encapsulate packets in order to transport them via a virtual service appliance. Also, a service appliance is able to be added and/or inserted into an overlay network without any changes needing to be made to the service appliance, as the service appliance is not required to participate in control plane activities other than declaring what category of appliance it is prior to deployment.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus comprising a processor and logic integrated with the processor, executable by the processor, or integrated with and executable by the processor, the logic being configured to cause the processor to:
   designate one of a plurality of endpoint virtual network identifiers (EPVNIDs) for each endpoint device in a network, wherein each EPVNID is configured to be shared by one or more endpoint devices;
   designate a common waypoint virtual network identifier (WPVNID) for all transparent waypoint devices in the network which perform a same function;
   designate a unique WPVNID for each routed waypoint device in the network;
   designate a common virtual network identifier (VNID) for all virtual switches in a single virtual network, wherein a different VNID is designated for each virtual network;
   create a service chain table comprising each VNID, WPVNID, and EPVNID designated in the network individually correlated with at least a pair of VNIDs: a source VNID and a destination VNID, based on one or more policies affecting application of services to packets in the network; and
   send a next hop and a next routed hop that indicates a route to at least one service appliance in accordance with the one or more policies in response to a query to determine a service chain for one or more packets.

2. The apparatus as recited in claim 1, wherein multiple transparent waypoint devices which perform the same function are not implemented on a single host.

3. The apparatus as recited in claim 1, wherein the logic is further configured to cause the processor to:
  receive the query to determine the service chain for the one or more packets, the query including a query VNID and a destination address, the query VNID being for the one or more packets; and
  determine the next hop and the next routed hop for the one or more packets based on the service chain table.

4. The apparatus as recited in claim 3, wherein the logic is further configured to cause the processor to:
  derive a first destination VNID using the destination address; and
  derive a first source VNID using a source address included in the query.

5. The apparatus as recited in claim 4, wherein the logic configured to cause the processor to determine the next hop and the next routed hop is further configured to cause the processor to consult the service chain table using the query VNID, the first destination VNID, and the first source VNID.

6. The apparatus as recited in claim 1, wherein the at least one service appliance does not engage in control plane activities other than declaration of a category of the at least one service appliance prior to deployment in the network, and wherein the at least one service appliance is a virtual service appliance that has a unique WPVNID associated therewith in the service chain table.

7. The apparatus as recited in claim 1, wherein the service chain table further comprises a next hop and a next routed hop individually correlated to each VNID, WPVNID, and EPVNID designated in the network, wherein each correlated next hop indicates a next virtual or software defined network (SDN)-enabled switch and associated VNID, and wherein each correlated next routed hop indicates an inner media access control (MAC) address.

8. A method, comprising:
  designating one of a plurality of endpoint virtual network identifiers (EPVNIDs) for each endpoint device in a network, wherein each EPVNID is configured to be shared by one or more endpoint devices;
  designating a common waypoint virtual network identifier (WPVNID) for all transparent waypoint devices in the network which perform a same function;
  designating a unique WPVNID for each routed waypoint device in the network;
  designating a common virtual network identifier (VNID) for all virtual switches in a single virtual network, wherein a different VNID is designated for each virtual network;
  creating a service chain table comprising each VNID, WPVNID, and EPVNID designated in the network individually correlated with at least a pair of VNIDs: a source VNID and a destination VNID, based on one or more policies affecting application of services to packets in the network; and
  sending a next hop and a next routed hop that indicates a route to at least one service appliance in accordance with the one or more policies in response to a query to determine a service chain for one or more packets.

9. The method as recited in claim 8, wherein multiple transparent waypoint devices which perform the same function are not implemented on a single host.

10. The method as recited in claim 8, further comprising:
  receiving the query to determine the service chain for the one or more packets, the query including a query VNID and a destination address, the query VNID being for the one or more packets; and
  determining the next hop and the next routed hop for the one or more packets based on the service chain table.

11. The method as recited in claim 10, further comprising:
  deriving a first destination VNID using the destination address; and
  deriving a first source VNID using a source address included in the query.

12. The method as recited in claim 11, wherein the determining the next hop and the next routed hop comprises consulting the service chain table using the query VNID, the first destination VNID, and the first source VNID.

13. The method as recited in claim 8, wherein the at least one service appliance does not engage in control plane activities other than declaration of a category of the at least one service appliance prior to deployment in the network, and wherein the at least one service appliance is a virtual service appliance that has a unique WPVNID associated therewith in the service chain table.

14. The method as recited in claim 8, wherein the service chain table further comprises a next hop and a next routed hop individually correlated to each VNID, WPVNID, and EPVNID designated in the network, wherein each correlated next hop indicates a next virtual or software defined network (SDN)-enabled switch and associated VNID, and wherein each correlated next routed hop indicates an inner media access control (MAC) address.

* * * * *